US010226846B2

(12) United States Patent
Haimer

(10) Patent No.: US 10,226,846 B2
(45) Date of Patent: Mar. 12, 2019

(54) TOOL RECEPTACLE

(71) Applicant: Franz Haimer Maschinenbau KG, Hollenbach-Igenhausen (DE)

(72) Inventor: Franz Haimer, Igenhausen (DE)

(73) Assignee: Franz Haimer, Maschinenbau KG (DE)

( * ) Notice: Subject to any disclaimer, the term of this patent is extended or adjusted under 35 U.S.C. 154(b) by 309 days.

(21) Appl. No.: 14/971,016

(22) Filed: Dec. 16, 2015

(65) Prior Publication Data
US 2016/0096247 A1    Apr. 7, 2016

Related U.S. Application Data

(63) Continuation of application No. PCT/EP2014/063220, filed on Jun. 24, 2014.

(30) Foreign Application Priority Data

Jul. 1, 2013 (DE) .................. 10 2013 106 883
Apr. 2, 2014 (DE) .................. 10 2014 104 623

(51) Int. Cl.
B23Q 11/10 (2006.01)
B23B 51/06 (2006.01)
B23C 5/28 (2006.01)

(52) U.S. Cl.
CPC ...... *B23Q 11/1023* (2013.01); *B23Q 11/1015* (2013.01); *B23B 51/06* (2013.01); *B23B 2231/24* (2013.01); *B23C 5/28* (2013.01); *B23Q 11/1061* (2013.01)

(58) Field of Classification Search
CPC ....... B23B 51/06; B23B 2231/24; B23C 5/28; B23Q 11/1061; B23Q 11/1015; B23Q 11/1023
See application file for complete search history.

(56) References Cited

U.S. PATENT DOCUMENTS

| 3,037,264 A | * | 6/1962 | Mossberg ................. B23C 5/10 |
| | | | 407/11 |
| 3,948,330 A | * | 4/1976 | Langford, Jr. .......... E21B 10/18 |
| | | | 175/213 |
| 4,852,672 A | * | 8/1989 | Behrens .................... E21B 4/20 |
| | | | 175/135 |

(Continued)

FOREIGN PATENT DOCUMENTS

| DE | 102005013483 | 9/2006 |
| DE | 10210906 | 7/2008 |

OTHER PUBLICATIONS

International Search Report.

*Primary Examiner* — Sara Addisu
(74) *Attorney, Agent, or Firm* — Michael P. Mazza, LLC

(57) ABSTRACT

The invention relates to a tool receptacle 1 comprising a receiving body 3, which has a receiving opening 5 for a tool shaft 6 of a tool and a first fluid supply structure 22, 33 and 35 for supplying fluid to the tool, said fluid supply structure extending through the receiving body 3. In order to allow a diversified supply of working fluids to the tool, a second fluid supply structure 23, 34 and 41, which is not connected with the first fluid supply structure 22, 33 and 35, extends through the receiving body 3, hereby allowing a fluid supply to the tool which is separate from the first fluid supply structure 22, 33 and 35.

18 Claims, 9 Drawing Sheets

(56) References Cited

U.S. PATENT DOCUMENTS

| | | | | |
|---|---|---|---|---|
| 4,911,729 A | * | 3/1990 | Rooker | E21B 10/38 |
| | | | | 175/393 |
| 5,829,926 A | | 11/1998 | Kammermeier | |
| 6,732,820 B1 | * | 5/2004 | Broom | B23B 51/00 |
| | | | | 175/320 |
| 7,134,812 B2 | * | 11/2006 | Beckington | B23Q 1/0036 |
| | | | | 408/56 |

* cited by examiner

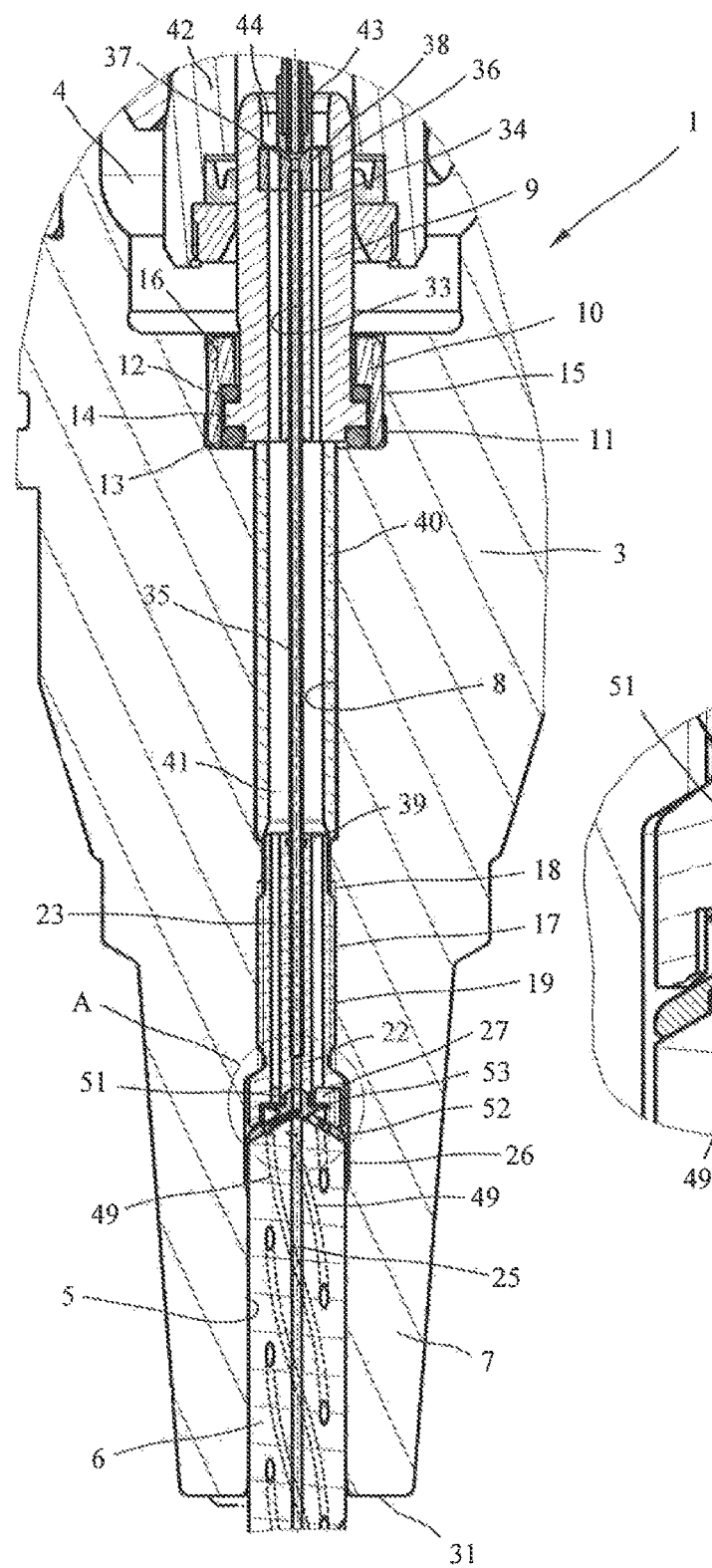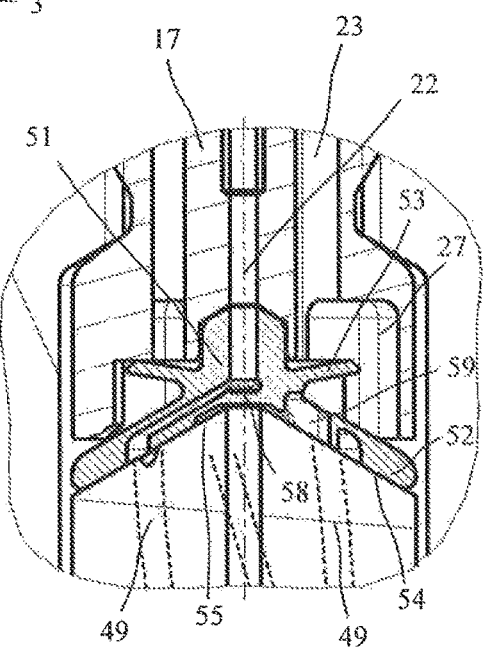
Fig. 15
Fig. 16

TOOL RECEPTACLE

PRIORITY CLAIM

This application claims priority from German Patent Application No. 10 2013 106 883.9, filed Jul. 1, 2013, German Patent Application No. 10 2014 104 623.4, filed Apr. 2, 2014, and PCT/EP2014/063220 filed Jun. 24.2014.

BACKGROUND OF THE INVENTION

The invention relates to a tool receptacle and also to a tool for such a tool receptacle.

Usually, modern tool receptacles are designed for an internal coolant supply. They generally have a central coolant channel through which a cooling lubricant, which is supplied via a coolant tube, can be guided from a working spindle of a machine tool to a receiving opening for the tool.

DE 10 2005 013 483 A1 discloses a generic tool receptacle in which in a receiving body a fluid supply structure has been provided for supplying a cooling fluid and/or lubrication fluid. to a tool inserted in a receiving opening of the tool body. In this well-known tool receptacle, the fluid supply structure is formed by a passage in a tubular transfer element arranged in the receiving body, by a passage in a stop sleeve arranged in the receiving body and by a connecting tube between the transfer element and the stop sleeve. However, this tool receptacle has only a single thoroughfare channel and is designed for supplying only a single cooling lubricant or a previously produced lubricant mist.

The invention has the objective of providing a tool receptacle and a tool for such a tool receptacle which allows for diversifying the supply of working fluids to a tool arranged in the tool receptacle.

Developments and advantageous embodiments of the invention are recited in the claims.

SUMMARY OF THE INVENTION

In the invention-based tool receptacle, two separate fluid supply structures or channels, which are not connected with one another, extend through the receiving body, though which different fluids can be guided separately to the blade of a tool without being mixed before or inside of the tool receptacle. For example, in this way, by means of a first fluid supply structure, liquid $CO_2$ can be guided under pressure through the tool receptacle to one or multiple cooling holes extending through the tool. At the same time, by means of a second fluid supply structure, an oil mist or any other conventional cooling lubricant is guided to the outside of the tool shaft and along said tool shaft to the tool blade. As a result, the application field of the tool receptacle can be extended. The two fluid supply structures are completely separate from one another and have separate in and outlets on the tool receptacle. Inside of the tool receptacle, no mixture of the fluids supplied via the two fluid supply structures takes place.

In a practical embodiment, the first fluid supply structure can be formed by a through hole in a connecting piece arranged in one of the receiving bodies. An additional through hole can be designed in a transfer element arranged in the receiving body, and a connecting tube arranged in the receiving body can be designed to connect the two through holes. The second fluid supply structure can be formed in the connecting piece by at least one thoroughfare channel which is separated from the through hole, in the transfer element at least one further thoroughfare channel which is separated from the further through hole, and a connecting passage arranged in the receiving body for connecting the thoroughfare channels.

In the first fluid supply structure, a sealed connection between the transfer element and the connecting piece can be achieved in that the connecting tube with its radially sealed ends is arranged in the through hole of the connecting piece and in the further through hole of the transfer element. The connecting tube can be securely mounted in the transfer element and axially movable in the connecting piece. In this way, it is possible to ensure a tight connection even when inside the receiving body an axial adjustment of the connecting piece may be required in relation to the length adjustment of the tool. Naturally the connecting tube can be also securely mounted in the connecting piece and axially movable in the transfer element.

In the second fluid supply structure, a sealed connection between the transfer element and the connecting piece can be achieved also by means of a sealing sleeve, which is arranged inside a through hole of the receiving body in concentric fashion to the connecting tube between the transfer element and the connecting piece. For example, if during minimum lubrication an oil mist passes through the second fluid supply structure, using a sealed contact of the sealing sleeve between the transfer element and the connecting piece can prevent oil in this area from being separated from the air flow and accumulating in non-flow areas. A connecting passage, which has an annular shape in cross section, for connecting thoroughfare channels in the transfer element with the thoroughfare channels in the contact part is restricted between the inner wall of the sealing sleeve and the outer wall of the connecting tube. In a practical embodiment, the sealing sleeve can be designed in such a way that it overlaps the connecting piece. As a result, the second fluid supply structure is sealed even with an axial adjustment of the connecting piece. However, the sealing sleeve can also be flexible in longitudinal direction and mounted under pretension between the transfer element and the connecting piece so that a sealed contact is maintained even with an axial adjustment of the connecting piece.

For a supply of fluid along the outside of a tool shaft, the second fluid supply structure can open into fluid channels, which are arranged in a frontal tensioned area of the receiving body. For example, these fluid channels can be formed by cross holes or longitudinal holes or by longitudinal slots on the inside of the receiving opening. The second fluid supply structure can open also into a distribution space between the inner end of the tool shaft and the receiving opening from which the fluid can be guided, for example, via cross holes in the tool shaft, to further decentralized holes in the tool.

To allow for a tight connection between the connecting piece and the tool shaft, a sealing component for sealing the tool shaft can be arranged at the end of the connecting piece facing the tool shaft. The sealing components can have different shapes to be perfectly adapted to the respective tool. In addition to or in place of the sealing component, it is also possible to provide at the end of the connecting piece facing the tool shaft a divider element for distributing the fluids supplied through the first and second fluid supply structure. Besides distributing the fluids, the divider element can assume also a sealing function. Practically, the divider element is connected in detachable fashion with the connecting piece so that by exchanging the different divider elements the tool receptacle can be adjusted relatively easy and cost-effective to different tools and processing requirements. However, the divider element can be designed also in one piece with the connecting piece.

In an advantageous manner, the divider element has a frontal contact part and a rear spring element. The spring element keeps the divider element flexible in axial direction, thus achieving additional shock absorption.

To achieve a distribution of the fluid flowing via the first fluid supply structure to multiple, for example, cooling holes extending helically through the tool shaft, the divider element can have a central through hole and a depression in the frontal contact surface. However, the divider element can comprise also a central through hole and passages which are connected with the thoroughfare channels of the connecting piece. By means of the central through hole, a fluid supplied via the first fluid supply structure can be guided to a central cooling hole. At the same time, a fluid supplied via the second fluid supply structure can be guided through further passages to further cooling holes in the tool. In a further embodiment, first passage channels extending from the inside to the outside and second passage channels extending from the outside to the inside can be provided in the divider element. This allows for a cross-wise fluid distribution so that, for example, a fluid supplied through the passages of the second fluid supply structure can be guided to a central cooling hole in the tool. While a fluid supplied through the central first fluid supply structure is guided radially to the outside to the cooling holes extending around the central cooling hole of the tool. It is also possible to use different embodiments of the divider element so that the tool receptacle can be adjusted in a relatively easy and quick manner to the respective processing requirements.

Preferably, the tool receptacle is designed in the form of a shrink chuck which can be expanded by heating the frontal tensioned area. However, it could be designed also in the form of a clamping chuck with a collet chuck and a clamping nut, an expansion chuck, a roller power chuck, or the like.

A tool for the tool receptacle described above has in the tool shaft at least one inlet port at its shell surface for at least one fluid channel. In addition, at least one inlet port for a further fluid channel is provided at the rear end surface of the tool shaft.

Further characteristics and advantages of the invention are included in the following description of preferred embodiments and the drawings:

BRIEF DESCRIPTION OF THE DRAWINGS

FIG. 15 a longitudinal section of an eighth embodiment of a tool receptacle;

FIG. 16 an expanded detailed view of region A in FIG. 15;

DETAILED DESCRIPTION OF PREFERRED EMBODIMENTS

Figures 1, 2:
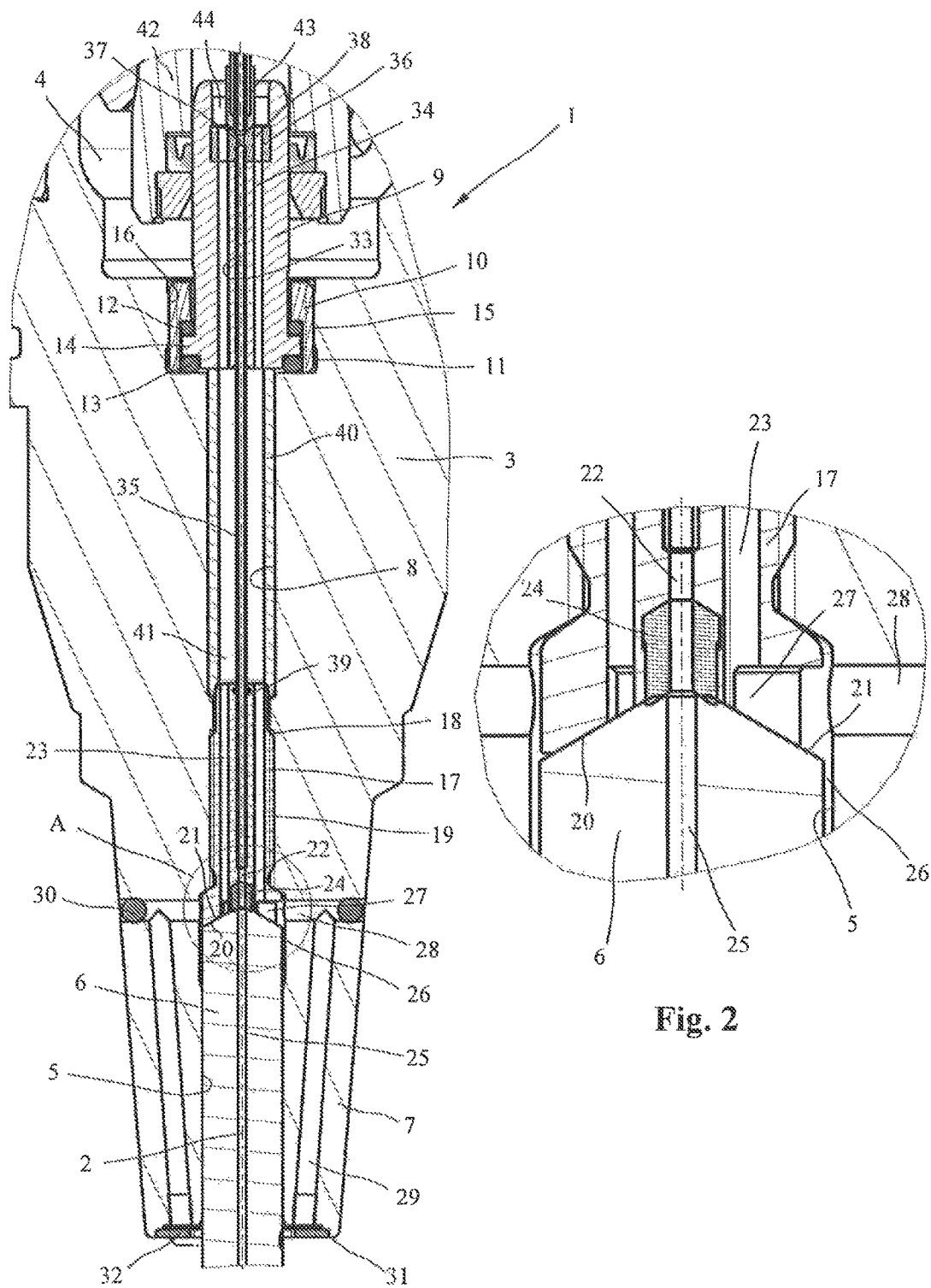
FIG. 1 a longitudinal section of a first embodiment of a tool receptacle.
FIG. 2 an expanded detailed view of region A in FIG. 1.

FIG. 1 shows a first embodiment of a tool receptacle 1 designed, for example, in the form of an HSK tool receptacle, which has a rotationally symmetric receiving body 3 that can be rotated about a central axis 2. At the end facing the machine, the receiving body has a cavity 4 for engaging tensioning elements, and at the end facing the tool, it has a receiving opening 5 for a tool shaft 6 of a tool designed in the form of a drill, a milling cutter or the like. In the embodiment shown, the tool receptacle 1 is designed in the form of a shrink chuck and has a frontal tensioned area range 7 in which the receiving opening 5 (which is aligned centrally in relation to the central axis 2) for the tool shaft 6 of the tool 2 is arranged. In such a tool receptacle 1, the frontal tensioned area 7 of the receiving body 3 is heated, for example, by means of induction heating, whereby the inside diameter of the receiving opening 5 is expanded. In heated condition of the frontal tensioned area, the tool shaft 6 of the tool is inserted in the receiving opening 5, wherein the proportion of the inside diameter of the receiving opening 5 in relation to the outside diameter of the tool shaft 6 is designed in such a way that during the subsequent cooling process of the tensioned area 7 the tool is tightly retained in the tool receptacle 1.

The receiving body 3 has a central through hole 8, which extends from the expanded cavity 4 at the end of the receiving body 3 facing the machine centrally through the receiving body 3 up to the receiving opening 5 for the tool shaft 6. At the transition from the cavity 4 to the through hole 8, a tubular transfer element 9 has been arranged in the receiving body 3. By means of a threaded sleeve 10, the tubular transfer element 9 is radially fixed with sealing components 12 and 13 in a step-like expansion 11 at the transition between the cavity 4 and the through hole 8. For this purpose, the tubular transfer element 9 has an annular collar 14, and the threaded sleeve 10 is screwed into an appropriate internal thread 16 of the step-like expansion 11 with a type of sleeve nut with an external thread 15.

At the transition between the through hole 8 and the receiving opening 5 for the tool shaft, a sleeve-like connecting piece 17 is arranged in such a way that it can be axially adjusted inside the receiving body 3. For this purpose, the sleeve-like connecting piece 17 is screwed via an external thread 18 into a respective internal thread 19 at the end of the central through hole 8 opening into the receiving opening 5. At the end facing the tool shaft 6, the sleeve-like connecting piece 17 has a stop surface 20 for attaching the rear end surface 21 of the tool shaft 6. Furthermore, the sleeve-like connecting piece 17 comprises a central through hole 22 and multiple thoroughfare channels 23 separated from said through hole, which thoroughfare channels 23 are radially offset to the outside in relation to the through hole 2 and extend in circumferential direction through the thoroughfare channels 23, spaced equiangular in longitudinal direction. For example, the thoroughfare channels 23 arranged about the central through hole 22 can have a cross section in the form of a ring segment At the end of the connecting piece facing the tool shaft 3, a sealing component 24 with a passage has been arranged for providing a sealed connection between the central through hole 22 and a central cooling hole 25 extending through the tool shaft 6. The sealing component can consist of flexible plastic material, metal or any other appropriate material.

As shown particularly in FIG. 2, the receiving opening 5 arranged in the frontal tensioned area 7 of the receiving body 3 is radially expanded at the inner end. As a result, a distribution space 26 for the cooling lubricant supplied through the thoroughfare channels 23 is formed between the inner end of the tool shaft 6 and the receiving opening 5. To form a connection between the thoroughfare channels 23 and the distribution space 26, radial recesses 27 are provided at the end of the sleeve-like connecting piece 17 facing the tool shaft 6 which open into the thoroughfare channels 23. In the frontal tensioned area 7 of the receiving body 3, multiple additional coolant channels are located which are distributed in circumferential direction. In the embodiment shown, these coolant channels are formed in the receiving body 3 by cross holes 28 and longitudinal holes 29, which are spaced equiangular in circumferential direction. The cross holes 28 extend from the outside of the receiving body 3 to the distribution space 26 and ae closed on the outside by a ball 30 or plug.

According to FIG. 1, the longitudinal holes 29 extend from the front end 31 of the receiving body 3 along the receiving opening 5 and open into the cross holes 28. Via the further coolant channels formed by the cross holes 28 and longitudinal holes 29, a fluid supplied through thoroughfare channels 23 of the connecting piece 17 can be guided along the outside of the tool shaft 6 to the blade of the tool. In a respective depression at the front end 31 of the receiving body 3, a distribution plate 32 with distribution holes or distribution slots can be arranged for specific distribution of the fluid supplied through the longitudinal holes 29 to the front end 31.

FIG. 1 shows that the tubular transfer element 9 comprises also a further central through hole 33 and multiple further thoroughfare channels 34 separated from said through hole 33. In relation to the through hole 33, these thoroughfare channels 34 extend radially offset to the outside and in circumferential direction spaced equiangular in longitudinal direction through the transfer element 9. Also here, the thoroughfare channels 34 arranged about the central through hole 33 can have a cross section in the form of a ring segment. The connection between the through hole 22 in the connecting piece 17 and the further through hole 33 in the transfer element 9 is performed by means of a connecting tube 35, which extends through the through hole 8 and the ends of which are positioned in the through hole 22 of the connecting piece 17 and the further through hole 33 of the transfer element 9.

In the embodiment shown, the end of the connecting tube 35 positioned in the through hole 33 of the transfer element 9 is axially secured in the transfer element 9. At the same time, the end of the connecting tube 35 protruding into the through hole 22 of the connecting piece 17 is axially movable in relation to the connecting piece 17 and sealed in the through hole 22 by means of a sealing component 39. As a result, the connecting piece 17 can be axially moved for adjustment. However, the connecting tube 35 can be axially secured also in the connecting piece 17 and movable in the transfer element 9. The end of the connecting tube 35 arranged in the transfer element 9 is positioned in a sealing piece 36, which is mounted in a depression of the transfer element 9 and which has, besides a central passage 37, outlines 38 aligning with the thoroughfare channels 33 in the transfer element 8.

In the through hole 8 of the receiving body 3, a sealing sleeve 40 is arranged between the transfer element 9 and the connecting piece 17. The sealing sleeve 40 is flexible in longitudinal direction so that both of its ends remain in a sealed connection with the transfer element 9 and the connecting piece 17 even when the connecting piece is axially adjusted. A connecting passage 41 with an annular cross section is restricted between the inner wall of the sealing sleeve 40 and the outer wall of the connecting tube 35. Via said connecting passage 41, a fluid supplied through the thoroughfare channels 23 of the transfer element 9 can be guided to the thoroughfare channels 23 of the connecting piece 17 and from there via the cross holes and longitudinal holes 27 or 28 to the outside of the tool.

The transfer of the fluids from a machine spindle to the transfer element 9 takes place by means of a coupling component 42 with a central transfer lance 43, which exerts pressure on the sealing piece 36. An annular space 44 is provided between the central transfer lance 43 and the coupling component 42 that can be mounted on the transfer element 9. By means of the central transfer lance 43, a fluid can be supplied via the transfer element 9, the connecting tube 35 and the connecting piece 17 to the central cooling hole 25 in the tool. By means of the annular space 44, a further fluid can be supplied via the thoroughfare channels 34 of the transfer element 9, the connecting passage 41 and the thoroughfare channels 34 in the connecting piece 17 to the fluid channels (here formed by the cross holes 28 and longitudinal holes 29) in the tensioned area 7 of the receiving body 3.

FIGS. 3 to 16 show further embodiments of a tool receptacle 1 with a 2-channel fluid supply. The basic structure and function of these embodiments basically corresponds to the preceding description and the embodiment shown in FIGS. 1 and 2. Therefore the corresponding components are provided with the same reference numerals and reference is made to their description.

Figures 3, 4:
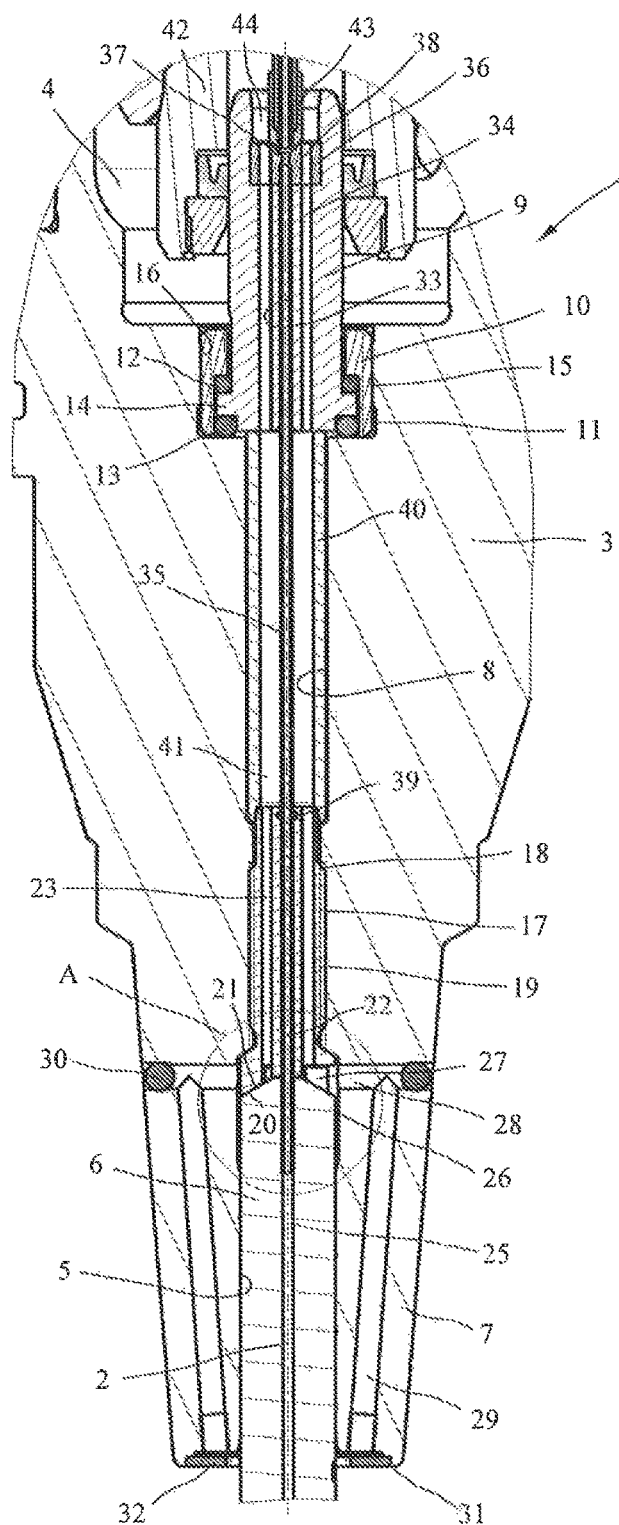
FIG. 3 a longitudinal section of a second embodiment of a tool receptacle.
FIG. 4 an expanded detailed view of region A in FIG. 3.

The further embodiment shown in FIGS. 3 and 4 basically corresponds with the embodiment described above. Therefore, with regard to its structure, reference is made to the description of said embodiment. However, in contrast with the description of FIGS. 1 and 2, the end of the connecting tube 35 facing the tool shaft 6 does not end in the connecting piece 17 but protrudes through said connecting piece 17 and engages in the central cooling hole 25 of the tool.

Figure 5:
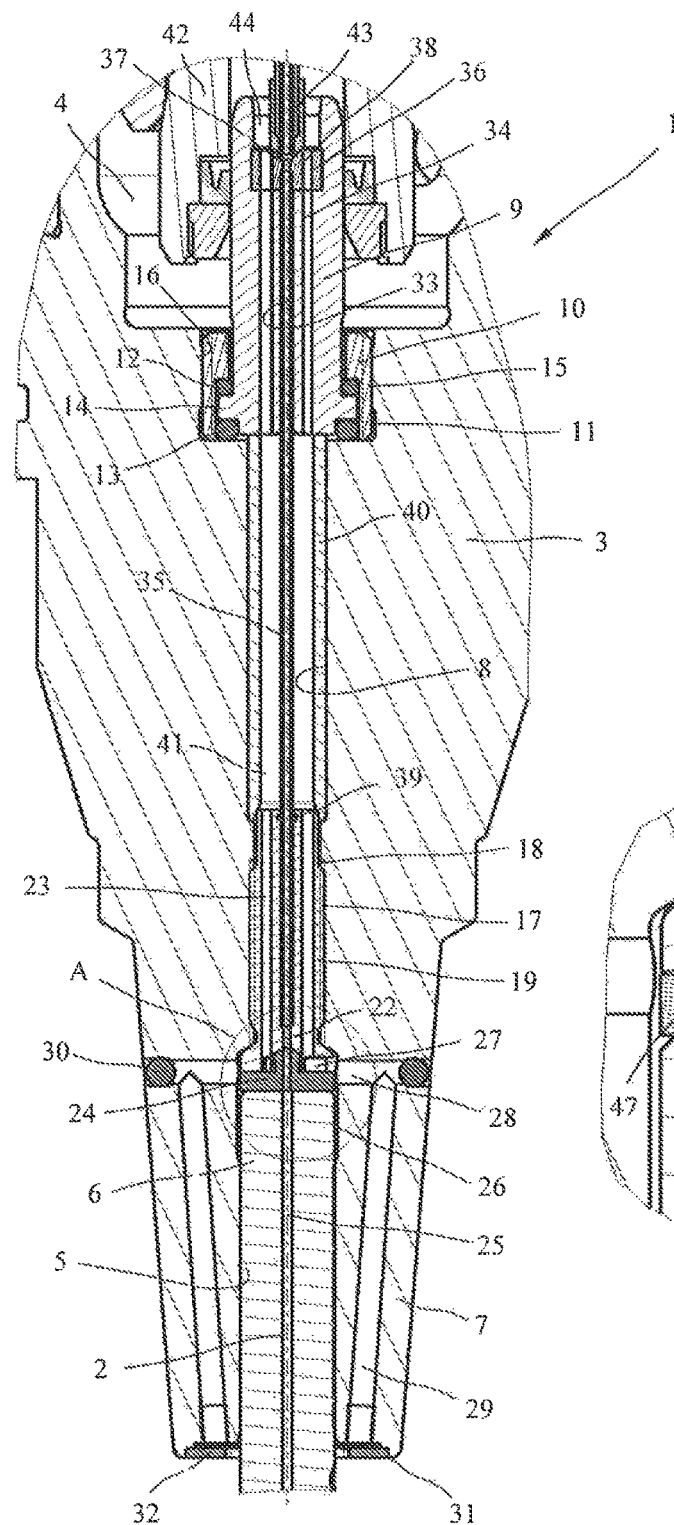
FIG. 5 a longitudinal section of a third embodiment of a tool receptacle.
Figure 6:
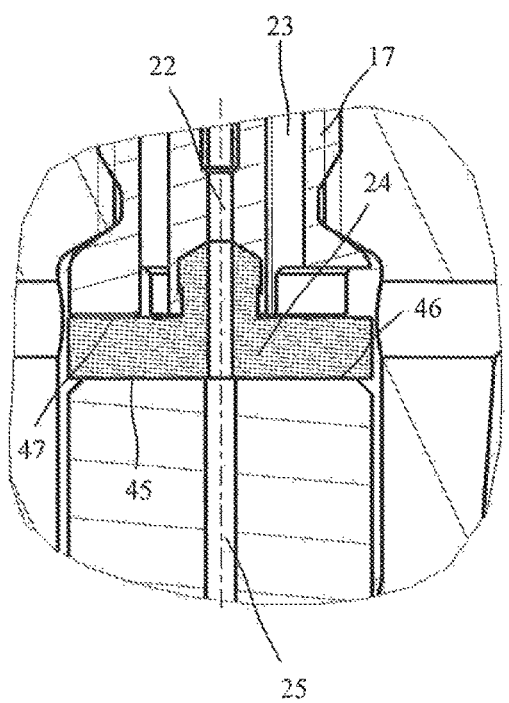
FIG. 6 an expanded detailed view of region A in FIG. 5.

The embodiment shown in FIGS. 5 and 6 basically also corresponds with the embodiment shown in FIGS. 1 and 2. Only the connecting piece 17 and the sealing component 24 have a different design. FIG. 6 shows that the sealing component 24 arranged at the end of the connecting piece 17 facing the tool shaft 6 has a planar contact surface 45 for attaching to a planar rear surface 46 on the tool shaft 6 of a tool. The connecting piece 17 has also a planar front surface 47 to Which the sealing component 24 provided with a passage is attached. By means of such an embodiment, a sealed fluid supply to a central cooling hole can be ensured with tools which have a planar rear surface instead of a conical rear surface at the rear end of the tool shaft.

Figures 7, 8:
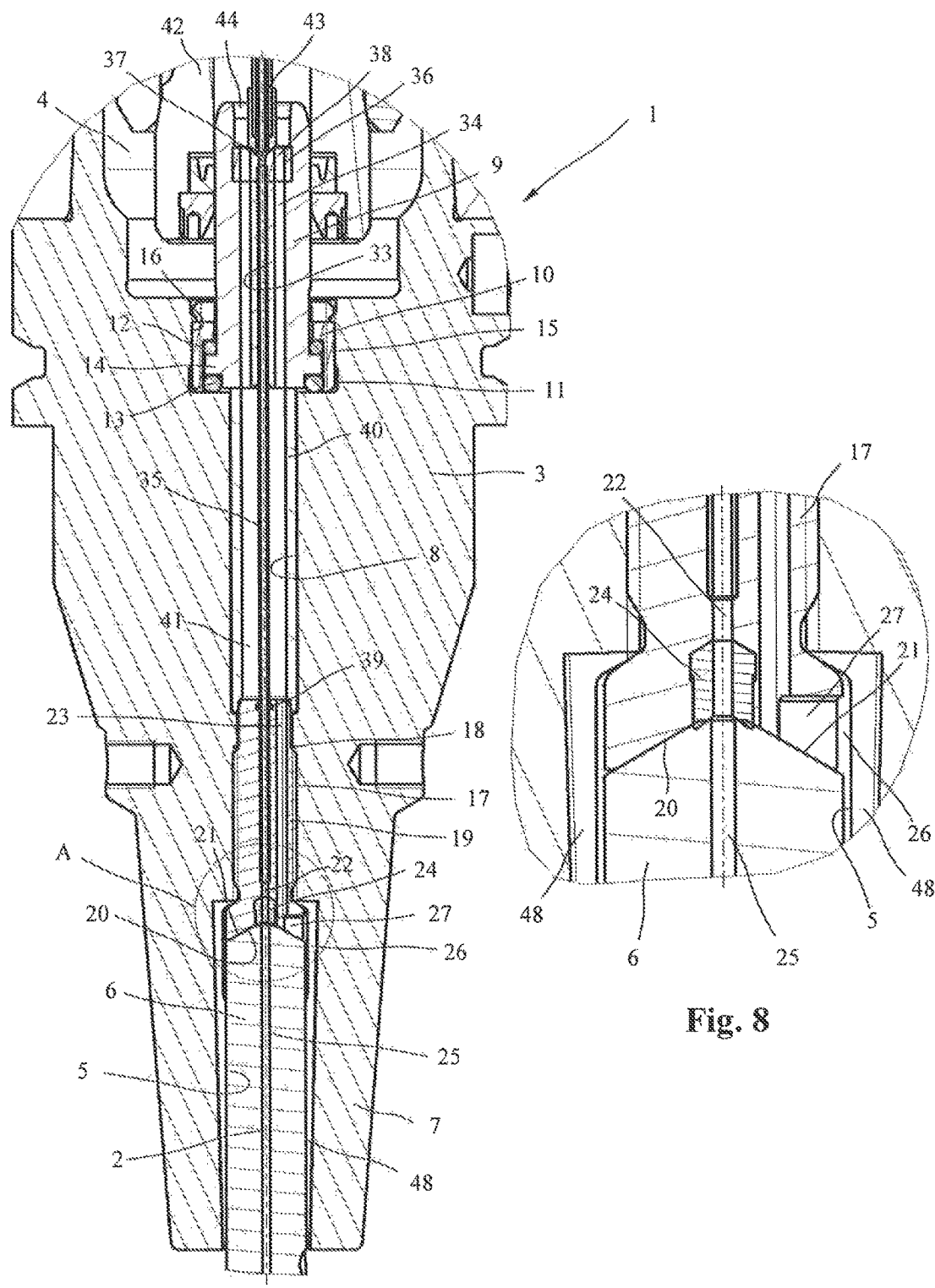
FIG. 7 a longitudinal section of a fourth embodiment of a tool receptacle.
FIG. 8 an expanded detailed view of region A in FIG. 7.

In the embodiment shown in FIGS. 7 and 8, the fluid channels arranged in the tensioned area 7 of the receiving body 3 are designed in the form of longitudinal slots 48 on the inside of the receiving opening 5. Via these longitudinal slots 48, the fluid supplied through the thoroughfare channels 34 in the transfer element and the thoroughfare channels 23 in the connecting piece 17 can be guided along the tool shaft 6 of the tool to the front end of the receiving body 3 and be discharged there.

Figures 9, 10:
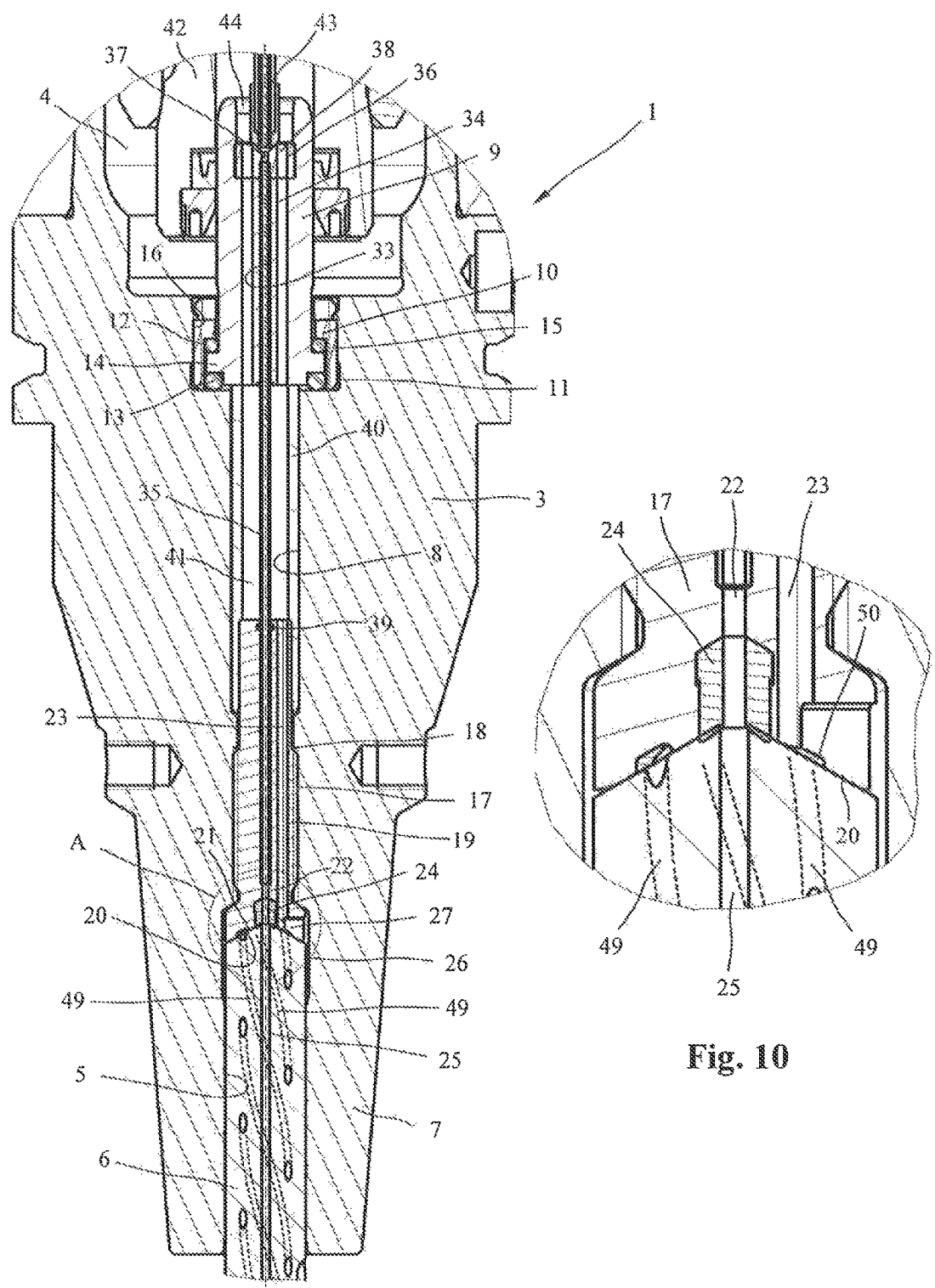
FIG. 9 a longitudinal section of a fifth embodiment of a tool receptacle.
FIG. 10 an expanded detailed view of region A in FIG. 9.

FIGS. 9 and 10 show a further embodiment. In this embodiment, the tool inserted in the receiving opening 5 of the receiving body 3 has in its tool shaft 6 in addition to the central cooling hole 25 multiple cooling channels 49 extending in helical fashion about the cooling hole. On the stop surface 20 facing the tool shaft 6, the connecting piece 17 has a depression 50 by means of which a fluid supplied through the thoroughfare channels 23 can be guided to the cooling channels 49 extending through the tool shaft 6. However, a fluid supplied through the central through hole 22 of the connecting piece can be guided to the central tooling hole 25. As a result, the central cooling hole 25 and the cooling channels 49 can be supplied by means of separate fluid supply structures. In this embodiment, the sealing sleeve 40 arranged in the through hole 8 is designed in such a way that it overlaps the connecting piece 17. As a result, it is possible to ensure a sealed connection between the transfer element 9 and the connecting piece 17, even when the connecting piece 17 is axially adjusted.

Figures 11, 12:
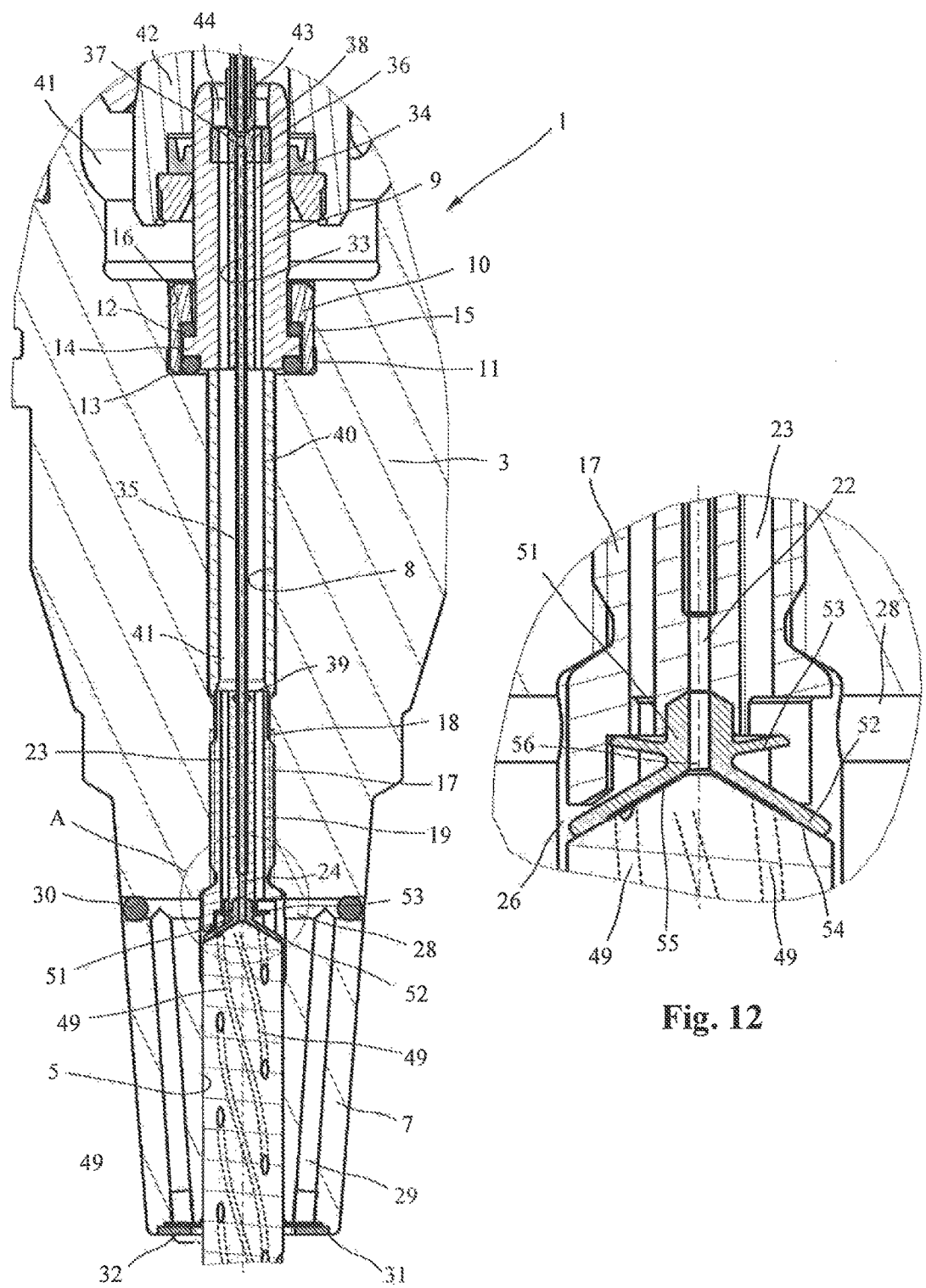
FIG. 11 a longitudinal section of a sixth embodiment of a tool receptacle.
FIG. 12 an expanded detailed view of region A in FIG. 11.

In the embodiment shown in FIGS. 11 and 12, a divider element 51 is arranged at the front end of the connecting piece 17 facing the tool shaft 6. As shown in FIG. 12, the divider element 51 is inserted in an opening at the front end of the connecting piece 17 and has a frontal contact part 52 and a flexible rear spring element 53. By means of the rear spring element 53, the divider element 51 is designed in axially pre-loaded fashion.

FIG. 12 shows that in this embodiment the divider element 51 has a depression 55 on a conical front surface 54 of the contact part 52. A central passageway 56 extending through the divider element 51 opens into said depression 55. The depression 55 is designed in such a way that it covers in sealed fashion to the outside the openings of cooling holes 49 extending through the tool. In this embodiment, a fluid supplied via the central through hole 22 in the connecting piece 17 can be guided by means of the divider element 51 to the cooling holes 49 extending through the tool shaft 6 of the tool. A fluid supplied by means of the thoroughfare channels 23 can be supplied via the cross holes 28 and longitudinal holes 29 to the front end of the receiving body 3.

Figures 13, 14:
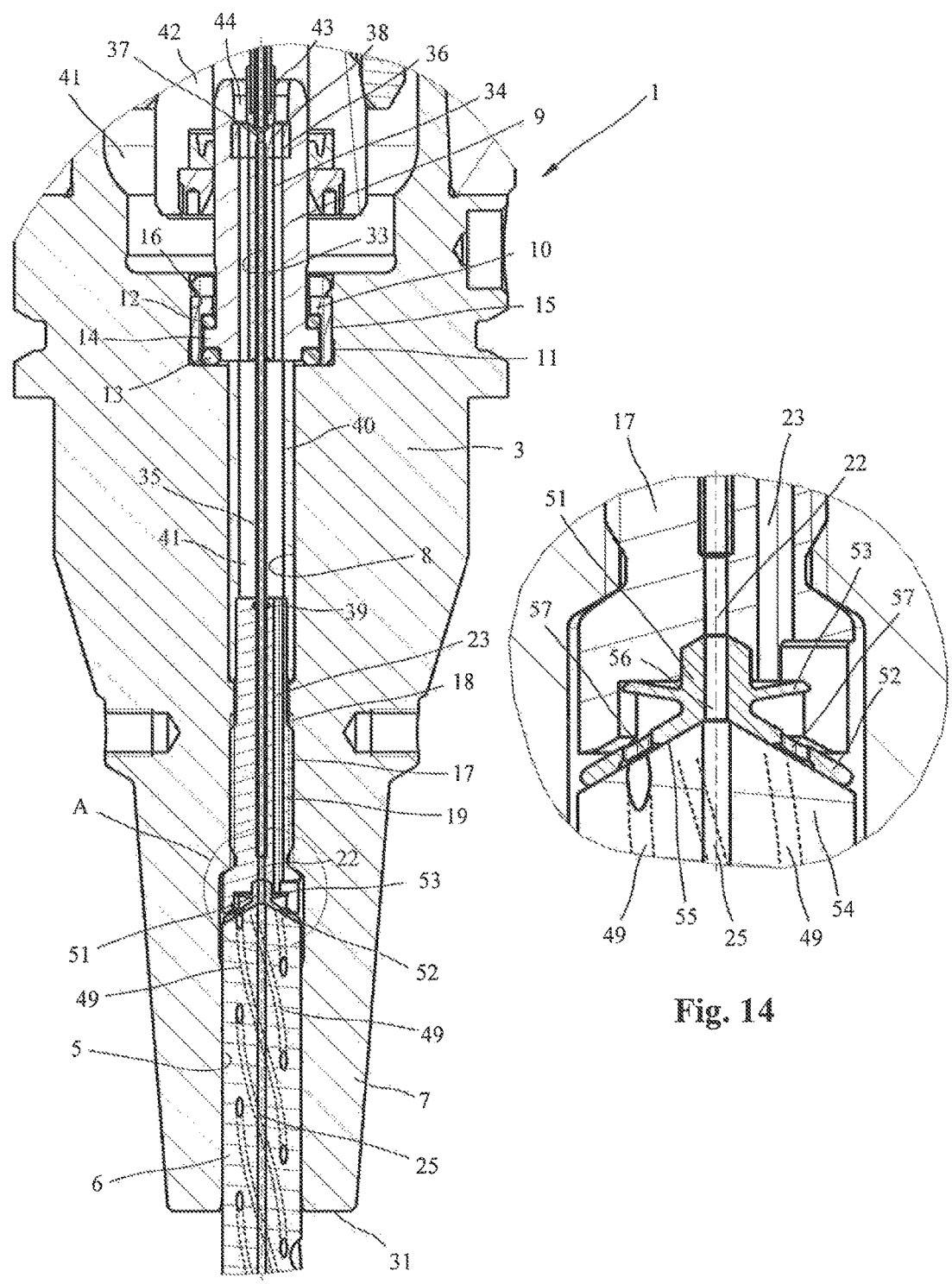
FIG. 13 a longitudinal section of a seventh embodiment of a tool receptacle.
FIG. 14 an expanded detailed view of region A in FIG. 13.

FIGS. 13 and 14 sow a further embodiment in which a divider element 51 is arranged at the front end of the connecting piece 17. Also in this embodiment, the divider element 51 has a frontal contact part 52 and a flexible rear spring element 53. A central passageway 56 extends through the divider element 51, and a fluid can be supplied via the passageway 56 from the central through hole 22 in the connecting piece 17 to a central cooling hole 25 in the tool shaft 6 of the tool. In the frontal contact part 52 of the divider element 51, passages 57 are arranged, which are connected with the thoroughfare channels 23 of the connecting piece 17. Via these passages 57, a fluid supplied through the thoroughfare channels 23 can be guided to the cooling holes 49 extending through the tool shaft 6 of the tool.

In a further embodiment shown in FIGS. 15 and 16, the divider element is designed in such a way that a fluid supplied by means of the central through hole 22 of the connecting piece 17 is guided radially to the outside to the cooling holes 49 extending about the central cooling hole 25 in the tool shaft 6, and a fluid supplied by means of the thoroughfare channels 23 in the connecting piece 17 is guided radially to the inside to the central cooling hole 25. For this cross-wise fluid distribution, a first passage channel 58 extending from the inside to the outside and a second passage channel 59 extending from the outside to the inside are provided in the divider element 51 according to FIG. 16.

Figure 17:
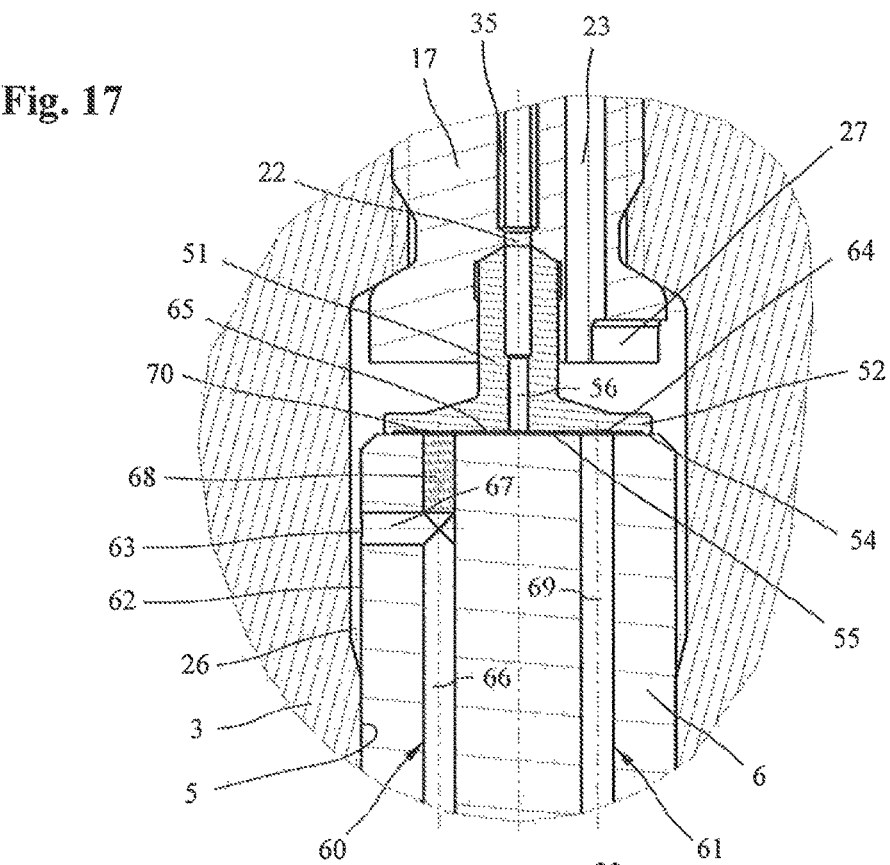
FIG. 17 an expanded detailed view of a ninth embodiment.
Figure 18:
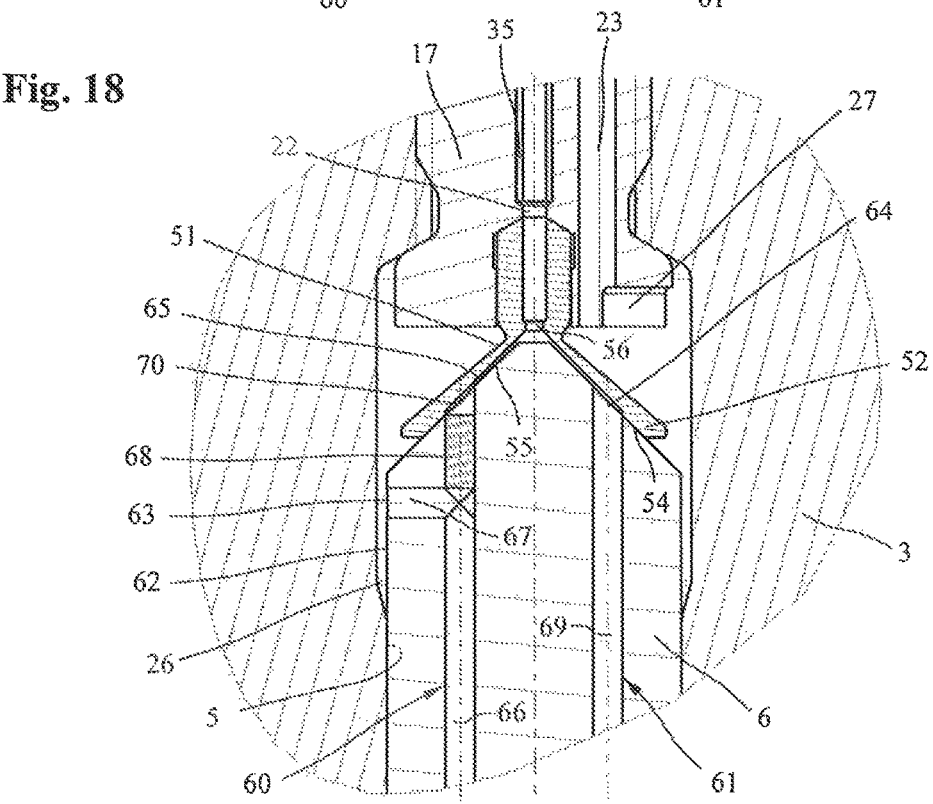
FIG. 18 an expanded detailed view of a tenth embodiment.

In FIGS. 17 and 18, a further embodiment is shown, which has a divider element 51 arranged at the front end of the connecting piece 17. By means of the divider element 51 shown here, the fluids supplied via the central through hole 22 and a thoroughfare channel 23 in the connecting piece 17 can be distributed to multiple fluid channels 60 and 61 in a tool shaft 6. The receiving opening 5 arranged in the receiving body 3 is radially expanded in the region of the end of the tool shaft 6 positioned in the receiving opening 5. As a result, a distribution space 26 for the fluid supplied by means of the thoroughfare channel 23 is available between the inner end of the tool shaft 6 and the receiving opening 5.

In the embodiments shown in FIGS. 17 and 18, a first fluid channel 60, which has an inlet port 63 at the cylindrical shell surface 62 of the tool shaft 6 in the region of the distribution space 26, extends through the tool shaft 6. A second fluid channel 61, which has an inlet port 64 at a rear surface 65 of the tool shaft 6 extends also through the tool shaft 6. In the embodiments shown, the first fluid channel 60 is formed by a longitudinal hole 66, which extends in longitudinal direction of the tool shaft 6 and runs completely through the tool shaft 6, as well as by a cross hole 67, which extends perpendicular to the longitudinal hole 66, wherein the portion of the longitudinal hole positioned above the cross hole 67 is closed by a plug 68. The second fluid channel 61 is formed by a longitudinal hole 69, which extends in longitudinal direction of the tool shaft 6 and runs completely through the tool shaft 6, and which has the inlet port 64 at the rear surface 65. In the embodiment shown in FIG. 17, he tool shaft 6 has a planar rear surface 65, whereas the tool shaft 6 in the embodiment of FIG. 18 has a conical rear surface 65.

Like in the embodiments of FIGS. 12, 14 and 16, the divider element 51 has a frontal contact part 52 for attaching at the rear surface 65 of the tool shaft 6. The contact part 52 is designed in such a way that is covers the rear surface 65 of the tool shaft 6 with the inlet port 64 of the longitudinal hole 69 and the opening 70 of the longitudinal hole 66, which is closed by the plug. In the embodiment shown in FIG. 17, the contact part 52 is designed for covering the planar rear surface 65 of a tool shaft 6. In the embodiment shown in FIG. 18, the contact part 52 is designed for covering the conical rear surface 65 of a tool shaft 6.

In both embodiments according to FIGS. 17 and 18, a depression 55 is provided in a frontal Contact surface 54 of the contact part 52. A central passageway 56, which extends through the divider element 51, opens into the depression 55. The depression 55 is designed in such a way that it is arranged above the inlet port and the opening 70, which is closed by the plug 68. By means of the central passageway, a fluid supplied via the central through hole 22 can be guided via the depression 55 to the inlet, port 64 of the fluid channel 61. A fluid supplied by means of the thoroughfare channel 23 can be guided via the distribution space 26 and the lateral inlet port 63 to the fluid channel.

As has been described for the embodiment shown in FIG. 16, the fluid supply can be performed also in crosswise fashion in the embodiments shown in FIGS. 17 and 18.

In a further model, it is possible to design the divider element 52 in such a way that it covers only part of the holes opening to the front. One of the fluids could flow through the covered holes and the other fluid through the open holes.

The embodiment shown in FIGS. 17 and 18 is especially advantageous for drilling tools, because they stick in the workpiece and thus, via the channels 60 and 61, different fluids (for example, $CO_2$ and oil mist) can be supplied through the tool to the blade.

Naturally, the channels 25, 49, 60 and 61 included in all embodiments can open in the further process centrally at the blade end of the tool, at a specific tool blade or branching to multiple blades.

The invention claimed is:

1. A tool receptacle (1) comprising a receiving body (3), which has a receiving opening (5) for connection to a tool shaft (6) of a tool and a first fluid supply structure (22, 33, 35) for supplying fluid to the tool, the first fluid supply structure (22, 33, 35) extending through the receiving body (3), and further comprising a second fluid supply structure (23, 34, 41) which is not connected with the first fluid supply structure (22, 33, 35), wherein the second fluid supply structure (23, 34, 41) extends through the receiving body (3) and provides, a fluid supply to the tool which is separate from the first fluid supply structure (22, 33, 35), wherein the first fluid supply structure (22, 33, 35) is formed by a first through hole (22) positioned in a connecting piece (17) arranged in the receiving body (3), a second through hole (33) is positioned in a transfer element (9) arranged in the receiving body (3), and a connecting tube (35) is arranged in the receiving body (3) for connecting the first and second through holes (22, 33).

2. The tool receptacle of claim 1, wherein the second fluid supply structure (23, 34, 40) is formed in the connecting piece (17) and includes at least one thoroughfare channel (23) which is separated from the first through hole (22), the transfer element (9) includes at least one further thoroughfare channel (34) which is separated from the second through hole (33), and a connecting passage (41) arranged in the receiving body (3) for connecting the thoroughfare channels (23, 34).

3. The tool receptacle of claim 2, wherein the transfer element (9) is connected with the connecting piece (17) by means of a sealing sleeve (40) arranged inside a through hole (8) of the receiving body (3).

4. The tool receptacle of claim 3, wherein the sealing sleeve (40) is arranged in concentric fashion about the connecting tube (35) and the connecting passage (41) is restricted between an inner wall of the sealing sleeve (40) and an outer wall of the connecting tube (35).

5. The tool receptacle of claim 3, wherein the sealing sleeve (40) and the connecting piece (17) are connected with one another in overlapping fashion, thereby ensuring a sealed connection between the transfer element (9) and the connecting piece (17), even when the connecting piece (17) is axially adjusted.

6. The tool receptacle of claim 1, wherein the ends of the connecting tube (35) are radially sealed and arranged in the first through hole (22) of the connecting piece (117) and in the second through hole (33) of the transfer element (9).

7. The tool receptacle of claim 1, wherein the second fluid supply structure (23, 34, 41) is arranged in a distribution space (26) formed between the tool shaft (6) and the receiving opening (5), or opens into fluid channels (28, 29, 48) arranged in a frontal tensioned area (7) of the receiving body (3).

8. The tool receptacle of claim 7 wherein the fluid channels (28, 29, 48) are formed by cross holes and longitudinal holes (28, 29) in the frontal tensioned area of the receiving body (3), or by longitudinal slots (48) on the inner side of the receiving opening (5).

9. The tool receptacle of claim 1, wherein a sealing component (24) for sealing the tool shaft (6) is arranged at the end of the connecting piece (17) facing the tool shaft (6).

10. The tool receptacle of claim 1, wherein an end of the connecting piece (17) facing the tool shaft (6) includes a divider element (51) arranged for distributing fluids supplied via the first fluid supply structure (22, 33, 35) and the second fluid supply structure (23, 34, 41).

11. The tool receptacle of claim 10, wherein the divider element (51) has a frontal contact part (52) and a rear spring element (53).

12. The tool receptacle of claim 10, wherein the divider element (51) has a central passageway (56) and a depression (55) in a frontal contract surface (54).

13. The tool receptacle of claim 10, wherein the divider element (51) has a central passageway (56) and passages (57) that are connected with the passage channels (23) of the connecting piece (17).

14. The tool receptacle of claim 10, wherein the divider element (51) has a first passage channel (58) extending from the inside to the outside of the tool receptacle, and a second passage channel (59) extending from the outside to the inside of the tool receptacle.

15. The tool receptacle of claim 1, wherein the tool includes a tool shaft (6) inserted into a tool receptacle, wherein the tool shaft (6) includes at least one fluid channel (60) with at least one inlet port (63) arranged as a shell surface (62) of the tool shaft (6).

16. The tool of claim 15, wherein a second fluid channel (61) of the tool shaft (6) includes at least one inlet port (64) located at a rear surface (65) of the tool shaft (6).

17. The tool receptacle of claim 1, further comprising a central cooling hole (25) extending through the tool shaft (60) and multiple cooling channels (49) located within the tool shaft (6) and extending in helical fashion about the central cooling hole (25).

18. The tool receptacle of claim 17, wherein the connecting piece (17) includes a depression (50) facilitating guidance of fluid supplied through the thoroughfare channel (23) to the multiple cooling channels (49).

* * * * *